UNITED STATES PATENT OFFICE.

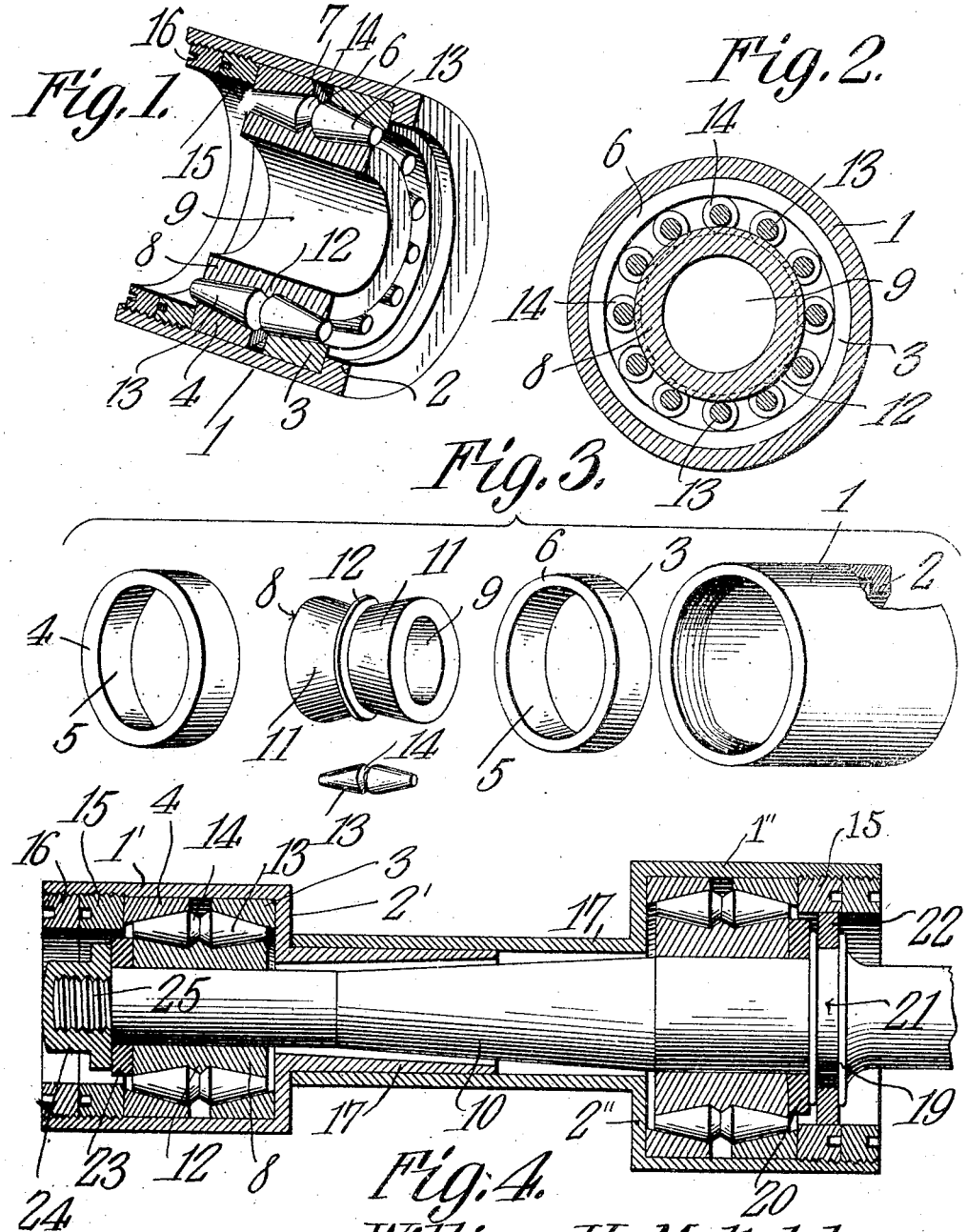

WILLIAM H. MAKUTCHAN, OF CHICAGO, ILLINOIS.

ROLLER-BEARING.

No. 904,343.  Specification of Letters Patent.  Patented Nov. 17, 1908.

Application filed June 10, 1907. Serial No. 378,213.

*To all whom it may concern:*

Be it known that I, WILLIAM H. MA-KUTCHAN, a citizen of the United States, residing at Chicago, in the county of Cook and State of Illinois, have invented a new and useful Roller-Bearing, of which the following is a specification.

This invention relates to that class of antifriction bearings in which a circular series of movable rollers is held between bearing surfaces which are made adjustable to take up wear.

The object of the invention is to provide an accurate roller bearing for use in all places where a bearing of this type can be employed, the construction of which is simple and strong and may be easily applied wherever desired with little change necessary in the mechanism receiving the bearing.

In the accompanying drawing:—Figure 1 is a sectional perspective view of the improved roller bearing. Fig. 2 is a cross sectional view of the same. Fig. 3 illustrates in perspective the several parts of the bearing separated. Fig. 4 is a longitudinal sectional view of two of the bearings applied to a vehicle hub.

Similar numerals of reference indicate the several parts in all the figures.

Within a casing 1, preferably cylindrical, is contained the several parts of the roller bearing. At one end of the shell is a short inwardly extending flange 2 to retain the parts in place at that end, while at the opposite end of the shell there is cut an interior thread as shown.

Fitting snugly within the shell 1 are two cylindrical bearing rings 3 and 4, the inner faces 5 of which are tapered at the same angle but reversely. One of the rings, as 3, when assembled rests against the flange 2, as shown, with its narrower edge 6 facing outwardly. Slightly separated from the ring 3 is the ring 4, its narrow edge 7 facing inwardly or towards the narrow edge of the ring 3.

Within the rings 3 and 4 is a sleeve 8 having a central or axial opening 9 of sufficient size to easily fit an axle or shaft 10, (see Fig. 4.) The peripheral surface 11 of the sleeve 8 is tapered from each end inwardly towards the center at the same angle as the inner faces of the circumjacent rings 3 and 4 but in reverse directions to said rings. At the longitudinal center of the sleeve 8 where the diameter is least is a projecting angular-shaped rib 12. The space between the collars 3 and 4 and the sleeve 8 serves as a race or track for the rollers 13, each of which is spindle-shaped, as represented in the drawings, with a groove 14 extending around its longitudinal center of the same size and shape in cross section as the rib 12 on the sleeve. By means of the rib 12 and the grooves 14 in the spindles, the latter are kept in place and forced to remain in line and rotate on axes parallel to the axis of the shaft 10. The rollers 13, from the grooves 14 to their opposite ends, are tapered at the same angle as the rings 3 and 4 and the peripheral surface of the sleeve 8.

From the above, it will be seen that when the rollers 13 are fitted between the sleeve 8 and the bearing rings 3 and 4, their shape will prevent them from moving longitudinally and that by moving the ring 4 inwardly, the bearing will be tightened and all lost motion between the parts taken up and rattling prevented. The movement of the bearing ring 4 to tighten the bearing is accomplished by means of a threaded adjusting ring 15 screwed into the outer end of the casing until it contacts with the bearing ring 4 which latter is forced inwardly by turning the adjusting ring. When the bearing has been properly tightened, a second threaded ring 16 is screwed against the adjusting ring 15 thus locking it and preventing it from loosening.

One application of the bearing is represented in Fig. 4 in connection with a vehicle axle. In this case two bearings are used, one at the outer and one at the inner end of the axle 10 and are alike in all respects except as to size, the inner bearing being the larger because of the tapering shape of the spindle. The flanges 2' and 2'' on the casings 1' and 1'' are wider and have attached to them tubular projections 17 which fit one within the other and join in the manner of the well known slip sleeve box. In the example shown there is a flange 19 on the axle against which a leather washer 20 is seated to form an abutment for the sleeve 8. A peripheral groove 21 is cut in the flange 19 for a dust ring 22, which extends outwardly to the adjusting ring 15. The outer end of the spindle 10 carries a leather washer 23 held thereon by a nut 24 screwed on the reduced threaded lug 25 projecting from the end of the axle. The sleeves 8 fit easily on the axle spindle and have a free end movement thereon, the leather washers 20 and 23 act as cushions to limit their movement but permit a free and independent motion of the sleeves and rollers to enable the said parts to adjust themselves to one another.

Having described my invention what I claim as new and desire to secure by Letters-Patent is:—

1. A roller bearing comprising an inner sleeve tapering toward the center from each end and there formed with an annular rib, reversely coned rollers having their bases joined and there provided with a peripheral groove into which the annular ribs fits, the rollers being of the same length as the sleeve, outer separate bearing rings having their inner faces tapered to conform to the cone ends of the rollers, said rings projecting beyond the ends of the rollers and sleeve, an outer casing for the bearing rings, and means for moving the bearing rings axially without contacting with the ends of the sleeve.

2. A roller bearing comprising an inner sleeve tapering toward the center from each end, reversely coned rollers with the bases of the cones adjacent and joined, the rollers being of the same length as the sleeve, outer separate bearing rings having their inner faces tapered to conform to the cone ends of the rollers, said rings projecting beyond the ends of the rollers and sleeve, an outer casing for the bearing rings, and means for moving the bearing rings axially without contacting with the ends of the sleeve.

3. In a roller bearing for axles, a sleeve having its outer surface tapered toward the center, a yielding abutment for one end of the sleeve, rollers each formed of two reversed cones joined at the bases and adapted to the tapered face of the sleeve, outer separate bearing rings having their inner faces tapered to conform to the cone ends of the rollers, and means acting directly on the rings for adjusting them simultaneously toward each other and reacting through the rings and rollers to center the sleeve relative to the said rings and rollers.

In testimony that I claim the foregoing as my own, I have hereto affixed my signature in the presence of two witnesses.

WILLIAM H. MAKUTCHAN.

Witnesses:
  THOMAS C. TAYLOR,
  J. W. TAYLOR.